April 21, 1959   A. L. BROCKWAY, JR   2,883,650
SYSTEM FOR REPRODUCING A VARYING D.C. VOLTAGE AT A DISTANCE
Filed Aug. 21, 1953   4 Sheets-Sheet 1

ARTHUR L. BROCKWAY, JR.
*INVENTOR.*

BY
*Killman and Kerst*
ATTORNEYS

April 21, 1959  A. L. BROCKWAY, JR  2,883,650
SYSTEM FOR REPRODUCING A VARYING D.C. VOLTAGE AT A DISTANCE
Filed Aug. 21, 1953  4 Sheets-Sheet 2

ARTHUR L. BROCKWAY, JR.
INVENTOR.

BY

Killman and Kerst
ATTORNEYS

April 21, 1959   A. L. BROCKWAY, JR   2,883,650
SYSTEM FOR REPRODUCING A VARYING D.C. VOLTAGE AT A DISTANCE
Filed Aug. 21, 1953   4 Sheets-Sheet 3

ARTHUR L. BROCKWAY, JR.
INVENTOR.

BY
Killman and Kerst
ATTORNEYS

April 21, 1959     A. L. BROCKWAY, JR     2,883,650
SYSTEM FOR REPRODUCING A VARYING D.C. VOLTAGE AT A DISTANCE
Filed Aug. 21, 1953     4 Sheets-Sheet 4

ARTHUR L. BROCKWAY, JR.
*INVENTOR.*

BY

*Killman and Kerst*
ATTORNEYS

United States Patent Office 2,883,650
Patented Apr. 21, 1959

2,883,650

SYSTEM FOR REPRODUCING A VARYING D.C. VOLTAGE AT A DISTANCE

Arthur L. Brockway, Jr., Baltimore, Md., assignor to Bendix Aviation Corporation, Towson, Md., a corporation of Delaware Application August 21, 1953, Serial No. 375,694

3 Claims. (Cl. 340—206)

This invention relates to a means for accurately reproducing a varying voltage level at a distance.

This problem occurs in many situations where it is necessary either to measure or monitor conditions at a physically inaccessible location, to exert control at a distance by means of such a voltage or to transmit a signal with a D.C. component which must be accurately reproduced.

It is often impossible to transmit such information accurately by wire due to the poor response of such a line to rapidly changing voltage, susceptibility to the pickup of low frequency noise and leakage inherent in the line. Furthermore, there are many locations where the use of a physical transmission line would not be possible.

It is an object of the invention to provide a system for reproducing a varying voltage at a distance with a high degree of accuracy.

It is another object of the invention to provide such a system which will require but few tubes and simple circuitry.

It is a further object of the invention to provide such a system in which amplitude changes in the transmitter or receiver will have a negligible effect upon the accuracy of the transmission.

It is still another object to minimize the effect of noise on such a system.

These and other objects and advantages of the invention are realized by a system in which the variation in the voltage level which is to be transmitted is translated into a delay interval between corresponding pulses of a train of reference pulses and a train of position modulated pulses. At the receiving end of the system the delay interval is utilized to reconstruct the original voltage.

Figure 1:
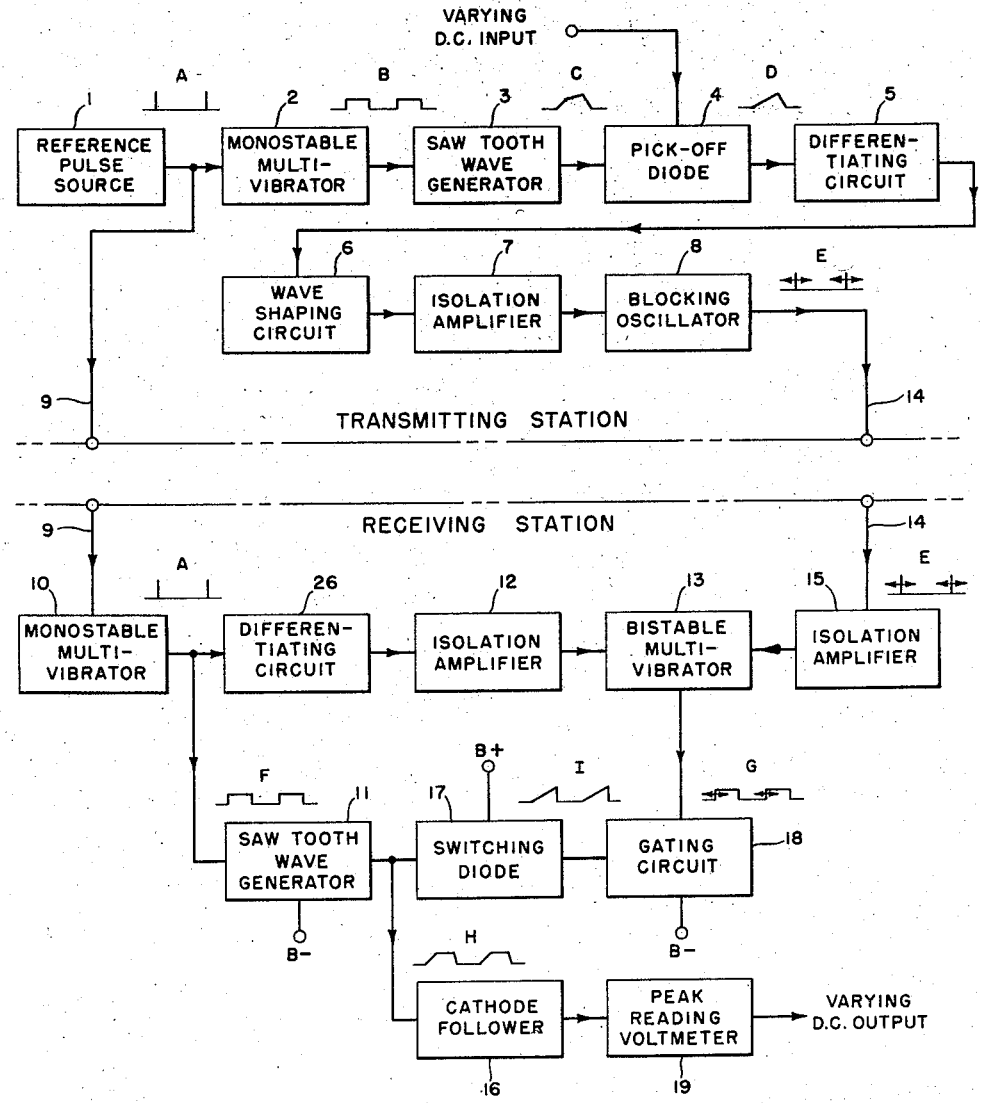
Fig. 1 is a block diagram of a system embodying the invention.
Figure 4:
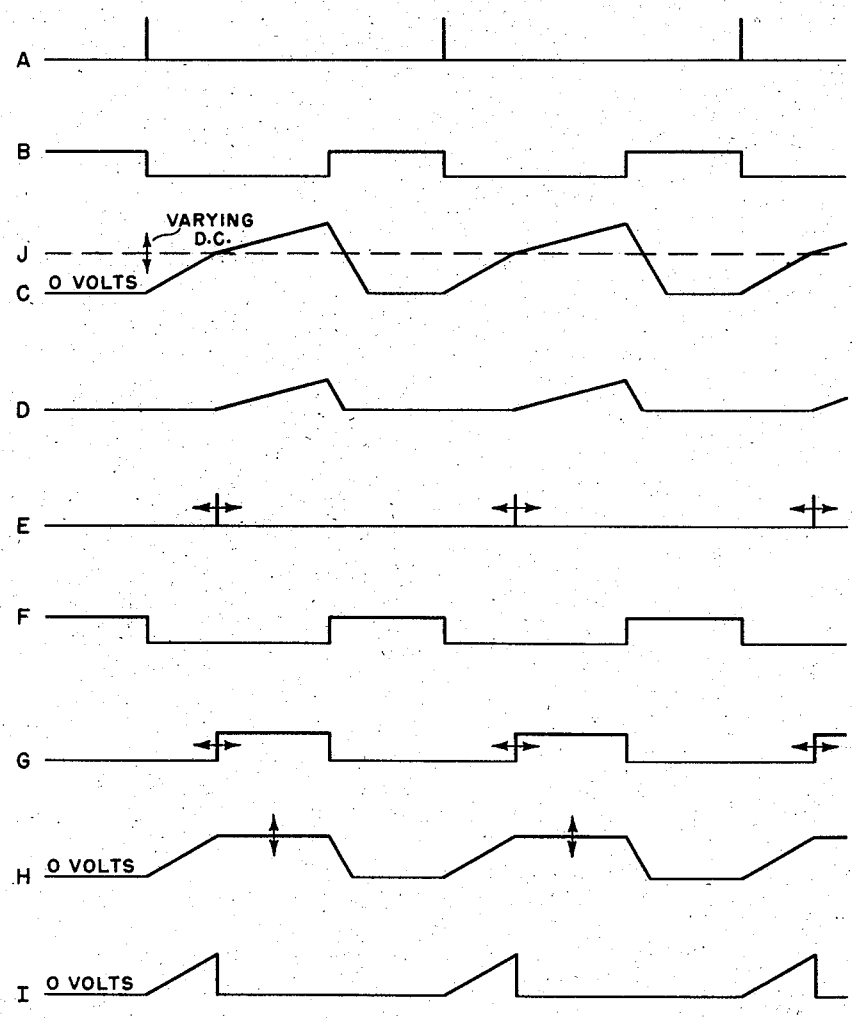

Referring now more particularly to Fig. 1 of the drawing in conjunction with the waveforms depicted in Fig. 4, it will be noted that the transmitting portion of the system includes a source 1 of reference pulses. These pulses are uniformly spaced to form a train as indicated by the curve A. The reference pulses are applied to a monostable multivibrator 2 to produce a waveform B which is applied to a sawtooth voltage generator 3 whose output waveform is that of curve C. It will be noted that the beginning of the sawtooth coincides with the negative going excursion of the waveform B.

A portion of the load of the sawtooth generator is a pick-off diode 4. The varying voltage which it is desired to reproduce in the distant station is applied to the diode 4 as biasing voltage with the result that the output of the diode is a sawtooth as shown at D, which has a duration which is a function of the bias voltage. The point of origin of the sawtooth varies with this voltage while the termination remains fixed. The waveform D is applied to a differentiating circuit 5 and the output of this circuit is shaped and amplified in a wave shaping circuit 6. The sharpened waveform is applied by way of an isolation amplifier 7, to trigger a blocking oscillator 8. The latter produces the pulse train E, the position of each pulse relative to the reference pulse being a function of the amplitude of the varying input.

The reference pulses and the pulses of waveform E are communicated to the receiving station. This may be accomplished by wire, as shown, by the use of two conductors, or by modulating a carrier if radio communication is employed between stations. Since means for accomplishing such modulation and transmission are well known they are not described here.

The reference pulses are shown as applied by an interstation conductor 9 to a monostable multivibrator 10 in the receiving station. The output of this circuit is a waveform F which is substantially identical with waveform B and is applied to a sawtooth wave generator 11 of the same type as generator 3 of the transmitting station.

The waveform F is differentiated by circuit 26, the output of which is applied by way of isolation amplifier 12 to trigger a bistable multivibrator 13. The triggering of the latter circuit occurs in coincidence with the leading edge of the positive going lobes of waveform F.

The pulses of waveform E are sent by conductor 14 to the receiving station where they are inverted in isolation amplifier 15 and applied to the bistable multivibrator 13 to trigger it into the remaining one of its stable states. The resulting gating voltage G is obtained from a point in the circuit 13 such that the leading edges of the positive going lobes are controlled in time by the pulses E while the trailing edges of the same lobes are controlled in time by the waveform F as mentioned above.

The output of the saw-tooth generator 11 is applied both to a cathode follower 16 and to a switching diode 17, the latter being serially connected between the output terminal of the generator 11 and the positive terminal of the plate voltage supply source. Connected between the switching diode and the negative terminal of this source is a normally non-conducting gating circuit 18. The waveform G is applied to the latter circuit to cause it to conduct only for the duration of the positive going lobes thereof.

The leading edge of the sawtooth waveform H which is the output of generator 11 begins to rise with a slope identical to that of the early portion of waveform C in the transmitting station. The switching diode provides substantially a short circuit under these conditions since the gating circuit is non-conducting. But when the leading edge of a positive excursion of waveform G renders the gating circuit conducting, the plate of the switching diode drops to a voltage below its cathode (0 v.), and the switching diode becomes an open circuit terminating the rise of the sawtooth of waveform H and providing a flat top to the sawtooth.

The waveform H is applied by way of the cathode follower 16 to a peak reading voltmeter 19 which provides a D.C. output at the level of the flat tops of the sawteeth of that waveform.

Figure 2:
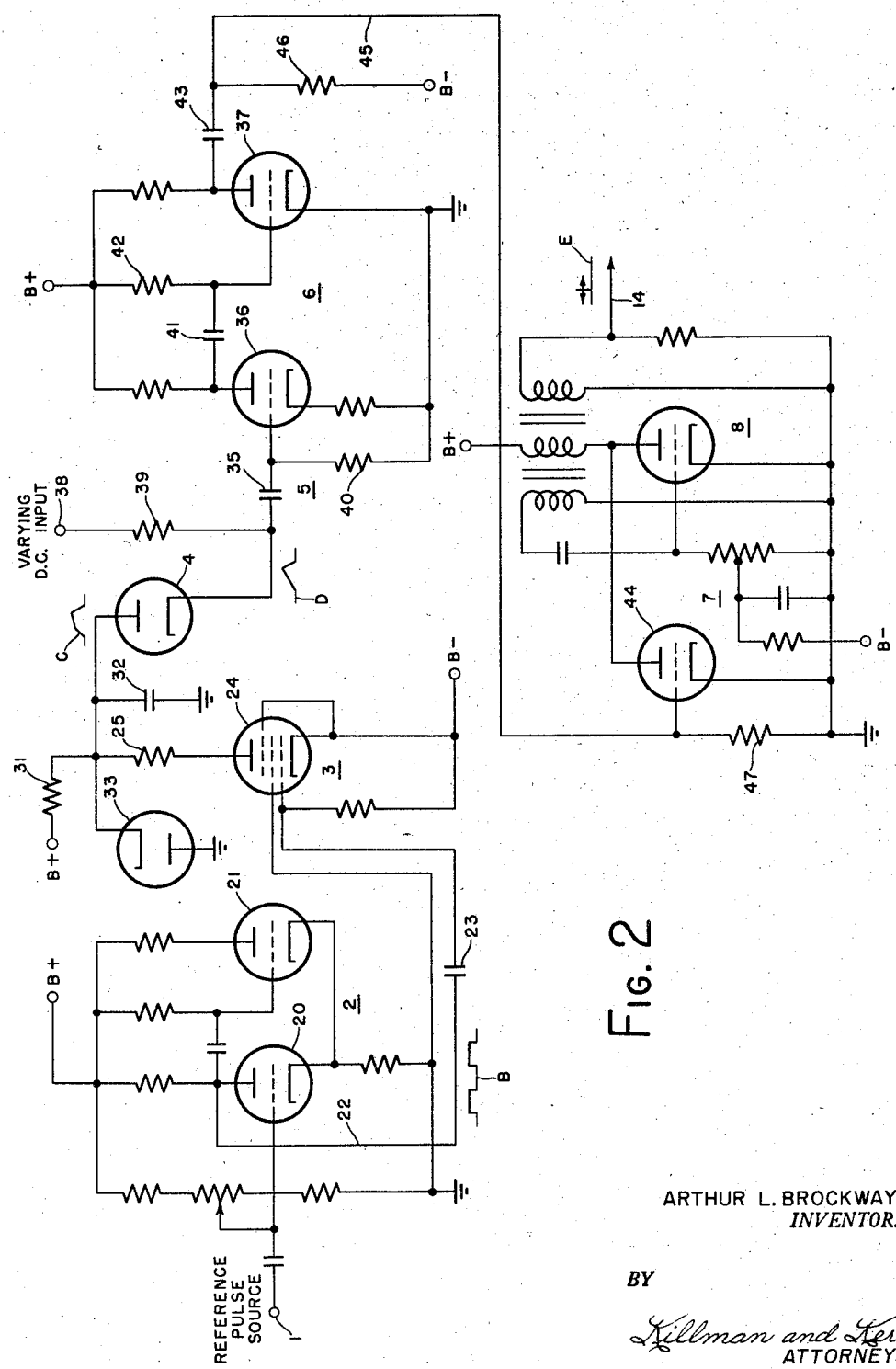
Fig. 2 is a schematic circuit diagram of the transmitting portion of the system of Fig. 1.

For a more detailed description of the transmitting station part of the system, attention is directed to the schematic diagram of Fig. 2. The monostable multivibrator 2 is shown as composed of two tubes 20 and 21 connected in a conventional manner. The source of reference pulses is indicated as a terminal 1 from which the pulses are applied to the intput circuit of tube 20.

The output of the circuit is taken at the plate of tube 20 and applied by conductor 22 and coupling capacitor 23 to the input of the sawtooth generator 3. The latter comprises a pentode 24, the plate of which is connected through a pair of serially connected resistors 25 and 31 to the positive terminal of a source of plate supply voltage. Connected between the junction of these resistors and ground is a capacitor 32. Also connected to the same junction is the cathode of a diode 33, the anode of which is grounded.

Connected also to the junction of resistors 25 and 31 is the anode of diode 4 the cathode of which is connected through a capacitor 35 to the control grid of a triode 36, which together with a triode 37 makes up the wave shaping circuit 6. The varying D.C. input is applied from a terminal 38 through a resistor 39 to the cathode of diode 4. A resistor 40 is connected between the grid of triode 36 and ground. The capacitor 35 and resistor 40 constitute the differentiating circuit 5. The output of triode 36 is coupled to the grid of triode 37 by a capacitor 41. The grid of triode 37 is returned to the positive terminal of the plate supply voltage source through a high resistor 42.

The output of the second section of the wave shaping circuit 6 is taken at the anode of tube 37 and applied by way of a capacitor 43 and a conductor 45 to the control grid of a triode 44 constituting the isolation amplifier 7. A resistor 46 is connected between the conductor 45 and the negative terminal of the plate supply source. The capacitor 43 and the resistor 46 in parallel with resistor 47 act as a differentiating circuit.

The isolation amplifier 7 and the blocking oscillator 8 are of conventional construction. The signal applied by the amplifier is a sharp pulse occurring at the point of origin of the sawtooth wave of curve D. It can be seen that this pulse will fluctuate in time in accordance with the level of the D.C. applied from terminal 38. The output of the blocking oscillator is a pulse train having the waveform E in which the pulses are varied in time of occurrence in accordance with the level of the varying voltage applied at 38.

In the operation of the circuit of Fig. 2 the reference pulses applied at 1 to the multivibrator 2 produce an output from that circuit having the waveform of curve B in which the trailing edge of each positive going lobe is synchronized with one of the reference pulses. The pentode 24 conducts during the positive going lobes of waveform B and is cut-off during the negative going lobes thereof. The voltage across capacitor 32 is maintained at a zero level during the conducting periods of pentode 24 by the action of clamping diode 33. When the pentode is cut-off coincident with one of the pulses of the reference train A the capacitor 32 begins to charge with the upper terminal going positive in accordance with the waveform C. The diode 4 is not conducting since the D.C. potential applied at 38 is at a higher level than the potential across the capacitor.

As the potential across the capacitor 32 rises to the D.C. potential level indicated by the dashed line J in Fig. 4, the diode 4 conducts and the small sawtooth of the waveform D appears across the capacitor 35. This waveform is differentiated by the combination 35, 40 and the resulting waveform is shaped into a positive going pulse at the plate of triode 37, the leading edge of which coincides with the origin of the sawtooth of curve D. This pulse is differentiated by the combination 43, 46 and 47 and applied by amplifier 7 to trigger the blocking oscillator 8.

Figure 3:
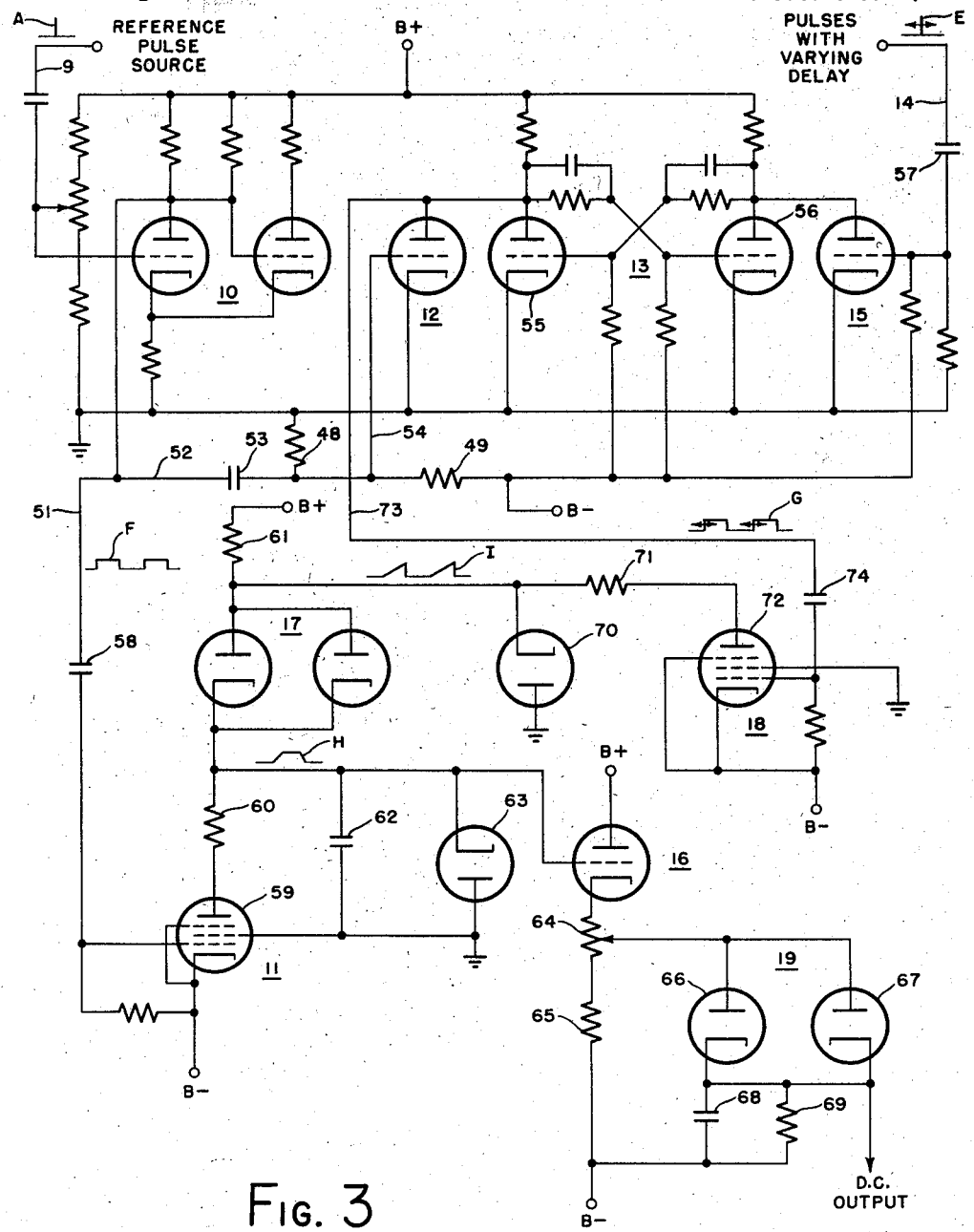
Fig. 3 is a schematic circuit diagram of the receiving portion of the system of Fig. 1; and, Fig. 4 is a set of curves depicting the waveforms occurring at various points in the circuits of Figs. 1, 2 and 3.

Turning now to Fig. 3 for the circuit of the receiving station, it will be noted that the monostable multivibrator 10 is of construction substantially identical to that of multivibrator 2 of Fig. 2 and produces an output waveform F substantially identical with waveform B and in which the trailing edge of each positive going lobe coincides with one of the reference pulses of curve A. This voltage is applied by conductor 51, branch conductor 52, to a differentiating circuit consisting of capacitor 53 and resistors 48 and 49 in parallel. The output of this circuit is applied by conductor 54 to the grid of an isolation amplifier tube 12, the plate of which is connected to the plate of a tube 55 of the multivibrator 13. The multivibrator also comprises tube 56.

The pulses of waveform E are applied by way of conductor 14, a capacitor 57 and inverter circuit 15 to the plate of the tube 56. The multivibrator 13 produces at the plate of tube 55 the output waveform G in which the leading edges of the positive going lobes are synchronized with the pulses of waveform E while the trailing edges of these lobes are synchronized with the leading edges of the positive going lobes of waveform F.

The waveform F is also applied by conductor 51 and capacitor 58 to the input of a pentode 59 forming a part of the sawtooth generating circuit 11. The pentode 59 is substantially identical with pentode 24 in the circuit of Fig. 2. The plate of this tube is connected to the positive terminal of a source of plate potential through a pair of series resistors 60 and 61. Between these resistors is connected a parallel array of two diodes forming the switching diode circuit 17, the plates of the diodes being connected to the resistor 61 and their cathodes to the resistor 60. A capacitor 62 is connected between the junction of resistor 60 with the diode switching circuit and ground. Connected across the capacitor 62 is a diode 63 with its plate grounded.

The junction of resistor 60 with the switching diode circuit 17 is also connected to the control grid of the cathode follower 16. The cathode of this tube is connected to the negative terminal of a plate voltage supply source through a pair of series resistors 64 and 65. A movable tap on resistor 64 is connected to the plates of a pair of diodes 66 and 67, the cathodes of which are connected to said negative plate supply voltage terminal by way of a time constant circuit consisting of a capacitor 68 shunted by a resistor 69. The output of the system is taken across this time constant circuit. The diodes 66 and 67 and the time constant circuit constitute and peak reading voltmeter 19.

The cathode of a diode 70 is connected to the junction of resistor 61 with the diode switch 17. The anode of this diode is grounded. This junction is also connected by way of a resistor 71 to the anode of a pentode 72 of the gating circuit 18. Voltage of wave-form G is applied to the control grid of this tube by way of a conductor 73 and coupling capacitor 74.

In the operation of the portion of the system illustrated in Fig. 3, the pulses of waveform E, applied to the anode of tube 56 in inverted form, cut off the tube 55, causing the voltage at the anode of that tube to abruptly rise. This produces the leading edge of the positive going lobes of waveform G. Pulses corresponding to the leading edges of the positive going lobes of waveform F, applied in inverted form at the anode of tube 55, cut off tube 56, thus terminating the positive going lobes of waveform G.

The terminal edge of each positive going lobe of waveform F, applied to the control grid of tube 59, drives that tube to cut off and at this point, which coincides with the reference pulses A in time, the capacitor 62 begins to charge through the diode switch 17 to produce at the upper terminal of the capacitor the sawtooth of the voltage waveform H. The clamp tube 63 prevents the voltage at this point from ever falling below ground. During this first portion of the sawtooth the tube 72 is cut off and thus presents a very high impedance to space current flow. The leading edge of each positive going lobe of waveform G will, however, render the tube conductive and the voltage at the junction of resistor 61 with the diode switch 17, which is depicted by the waveform I will drop to ground level thus causing the switch 17 to act substantially as an open circuit. The charge on the capacitor 62 will remain substantially unchanged until tube 59 conducts again with the application thereto of the next positive going lobe of waveform F. This provides the flat top to the waveform H. The simultaneous occurrence of the leading edge of the next positive-going pulse of waveform F and the trailing edge of the positive-going pulse of waveform G will place tube 72 in a cut off state, thus closing the switch 17 and rendering tube 59 conductive. The condenser 62 will begin to discharge through tube 59, terminating the flat top of waveform H and providing the trailing edge to the positive-going excursion.

The voltage of waveform H, being applied to cathode follower 16, is presented without distortion to the peak reading voltmeter 19. The resistance of resistor 69 is just low enough so that the capacitor 68 will discharge between the occurrence of the flat tops of adjacent excursions of wave form H by an amount which is slightly more than the maximum voltage drop which may be expected to occur between adjacent excursions of this waveform.

The output of the system may be made to follow the level of applied voltage with great accuracy. This accuracy depends upon the ability to generate a waveform H in the receiving station in which the slope of the sawtooth bears a direct proportionality to the slope of the sawtooth of waveform C, irrespective of time. In each station this slope is determined primarily by two circuit elements other than tubes, the elements being the resistor 31 and the capacitor 32 in the transmitting station and the resistor 61 and capacitor 62 in the receiving station. These resistors and capacitors can easily be selected so that the product of their resistance and capacity will have the same value at both stations.

It can be seen that amplitude variations in the output of the transmitting station or the input to the receiving station will have a negligible effect on the system output since that depends upon the relative positions of the pulses in a pair of pulse trains and not on their amplitudes. Amplitude changes caused by noise will also cause no difficulty for the same reason.

The system shown can also be utilized as a D.C. amplifier, the desired amplification being obtained by controlling the relative amplitudes of the plate supply voltages for the transmitting and receiving, or in this case the input and output, units.

Where $E_{in}$ is the voltage to be amplified; $E_{out}$ is the output voltage of the unit of Fig. 3; $E_1$ and $E_2$ are the plate supply voltages of the units of Figs. 2 and 3 respectively; $R_1$ and $C_2$ are the resistance of resistor 31 and the capacity of capacitor 32; and $R_2$ and $C_2$ are the resistance and capacitance of resistor 61 and capacitor 62 respectively: then $$E_{in} = E_1\left(1 - \epsilon^{-\frac{t}{R_1 C_1}}\right)$$

and, $$E_{out} = E_2\left(1 - \epsilon^{-\frac{t}{R_2 C_2}}\right)$$

and the ratio of these expressions is $$\frac{E_{out}}{E_{in}} = \frac{E_2\left(1 + \epsilon^{-\frac{t}{R_2 C_2}}\right)}{E_1\left(1 - \epsilon^{-\frac{t}{R_1 C_1}}\right)}$$

Now if $R_1 C_1 = R_2 C_2$, the ratio becomes $$\frac{E_{out}}{E_{in}} = \frac{E_2}{E_1}$$

The above expression will not hold strictly true with the circuit of Fig. 3, because of the presence of the cathode follower 16 with its below unity gain. To compensate for this factor the plate supply voltage of the output unit would have to be increased slightly to derive a desired ratio of amplification. The cathode follower could, however, be eliminated and the peak reading voltmeter coupled directly to the upper terminal of capacitor 62, in which case the above relationship would hold true.

The present circuit, when used as a D.C. amplifier, affords reliable, linear, D.C. amplification at voltage levels higher than those at which a satisfactory linear response can be obtained from circuits which rely upon the amplifying action of electron discharge tubes.

What is claimed is:

1. A system for reproducing a varying voltage at a distant location comprising: means generating a train of uniformly spaced reference pulses, means generating a second train of pulses each of which is spaced in time from a corresponding pulse of said train of reference pulses in accordance with the instantaneous value of said varying voltage, means transmitting said trains of pulses to said distant location, a source of voltage and an energy storage device in said distant location, a charging circuit for said energy storage means including said source of voltage, a discharging circuit for said energy storage means, means in each of said circuits for switching the impedance thereof between an open circuit value and a low value, means actuating said switching means in said discharge circuit to switch the impedance thereof to said open circuited value in coincidence with the occurrence of each of said reference pulses, and to switch said impedance to a low value at the expiration of a fixed period thereafter, means actuating said switching means in said charging circuit to switch the impedance thereof to said open circuited value coincident with each of said generated pulses and to switch said impedance to a low value at a time between the expiration of said fixed period and the occurrence of the next succeeding reference pulse, and means responsive to the energy stored in said energy storage means to provide a voltage output varying in accordance with the peak values thereof.

2. A system for reproducing a varying voltage at a distant location comprising: means providing a train of uniformly spaced reference pulses; a source of voltage, a first energy storage means, means actuated by each of said reference pulses to initiate the application of voltage from said source to charge said storage means, means responsive to the charging of said first storage means to the level of said varying voltage to generate a pulse coincident therewith, means transmitting said train of reference pulses and said generated pulses to said distant location, a source of voltage and a second energy storage means in said distant location, a charging circuit for said second energy storage means including said second source, a discharging circuit for said second energy storage means, means responsive to each of said reference pulses to switch the impedance of said discharging circuit from a low to an open circuited value, to maintain said open circuited value for a fixed period of less duration than the interval between said reference pulses, and to switch said impedance back to said low value at the expiration of said period, means responsive to each of said generated pulses to switch the impedance of said charging circuit from a low to an open circuited value whereby the charge on said second energy storage means remains substantially unchanged, and to switch said impedance from said open circuited value back to said low value at a time between the end of said period and the occurrence of the next succeeding reference pulse, whereby said second storage means is charged during the interval between the occurrence of each of said reference pulses and the next succeeding one of said generated pulses, maintains the charge so acquired until the termination of said period and then discharges, and means responsive to the energy stored in said second energy storage means to provide a voltage output varying in accordance with the peak values thereof.

3. A system for amplifying a varying voltage comprising: means providing a train of uniformly spaced reference pulses, a first source of voltage, a first energy storage means, means actuated by each of said reference pulses to initiate the application of voltage from said source to charge said storage means, means responsive to the charging of said first storage means to the level of said varying voltage to generate a pulse coincident therewith, a second source of voltage the magnitude of which bears substantially the same proportional relationship to the magnitude of the voltage of said first source that the desired magnitude of the output of said system bears to said varying voltage, a second energy storage means, a charging circuit for said second energy storage means including said second source, a discharging circuit for said second energy storage means, a monostable multivibrator responsive to said reference pulses to generate a waveform having negative-going pulses the leading edges of which coincide with said reference pulses and the trailing edges of which are separated from the said leading edges by a fixed period, an impedance element in said discharging circuit shiftable to an open circuited state in response to said leading edges of said waveform and to a low impedance state in response to said trailing edges thereof, means applying said waveform to said impedance element, a bistable multivibrator having a square wave output, means triggering said bistable multivibrator into one of its stable states coincident with each of said generated pulses and means triggering it into the other of its stable states coincident with the trailing edge of each of the negative-going pulses of the output of said monostable multivibrator, whereby the leading edges of the positive-going excursions of said square wave output are coincident with said generated pulses and the trailing edges of said positive-going excursions are coincident with the trailing edges of the negative-going pulses of the output of said monostable multivibrator, an impedance means in said charging circuit switchable between an open circuited state and a low value, means responsive to the leading edges of the positive-going excursions of the output of said bistable multivibrator to switch the last named impedance means to its open circuited state, and to the trailing edges thereof to switch said impedance means to its low value, and means responsive to the energy stored in said second energy storage means to provide a voltage output varying in accordance with the peak values thereof.

References Cited in the file of this patent

UNITED STATES PATENTS

| | | |
|---|---|---|
| 2,457,819 | Hoeppner | Jan. 4, 1949 |
| 2,466,705 | Hoeppner | Apr. 12, 1949 |
| 2,468,703 | Hammel | Apr. 26, 1949 |
| 2,500,536 | Goldberg | Mar. 14, 1950 |
| 2,504,975 | Grieg | Apr. 25, 1950 |
| 2,578,643 | Hayslett et al. | Dec. 11, 1951 |
| 2,616,960 | Dell et al. | Nov. 4, 1952 |
| 2,644,933 | Peterson et al. | July 7, 1953 |